CATHODE RAY TUBE RETRACE BLANKING CIRCUIT IN WHICH BLANKING SIGNALS ARE DERIVED FROM THE SYNC SEPARATOR
Filed Feb. 23, 1965
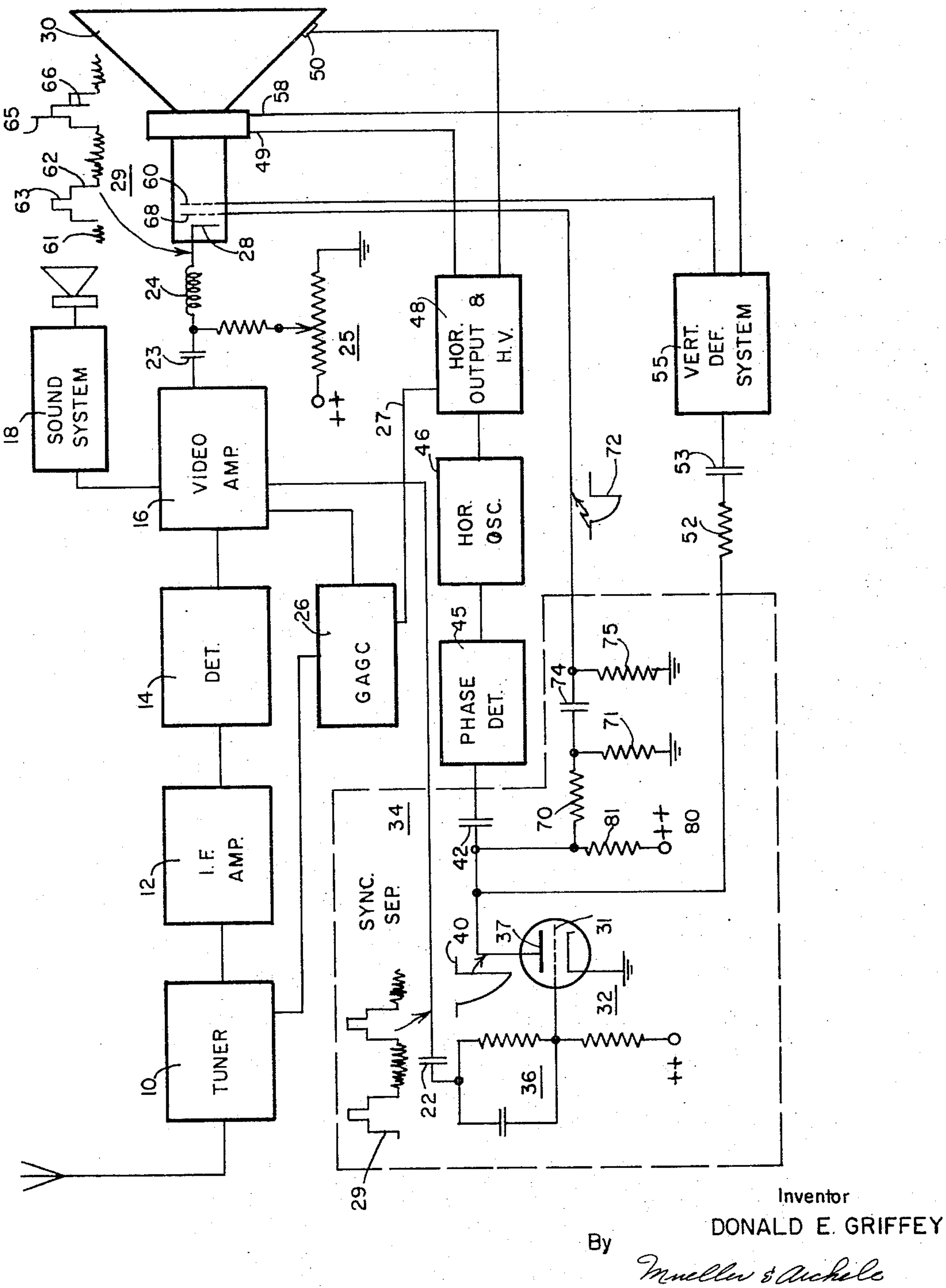
Inventor
DONALD E. GRIFFEY
By *Mueller & Aichele*
Attys.

United States Patent Office 3,364,307

Patented Jan. 16, 1968

3,364,307

CATHODE RAY TUBE RETRACE BLANKING CIRCUIT IN WHICH BLANKING SIGNALS ARE DERIVED FROM THE SYNC SEPARATOR

Donald E. Griffey, Skokie, Ill., assignor to Motorola, Inc., Franklin Park, Ill., a corporation of Illinois Filed Feb. 23, 1965, Ser. No. 434,370
4 Claims. (Cl. 178—7.5)

This invention pertains to a blanking circuit for a cathode ray tube in a television receiver, and more specifically to a blanking circuit, in a television receiver, having desirable high frequency response for the received video signal, for blanking the beam of the cathode ray tube during horizontal retrace.

It is desirable in a television receiver for the details in the transmitted video picture to appear sharp and clear on the receiver screen. Because the details of the picture are transmitted at high frequencies, it is necessary to adjust the video peaking circuits of the receiver to provide good high frequency response to the received video signal.

After the received video signal, containing the video frequency, blanking and synchronizing components, passes through the video peaking circuits, it is coupled to a control electrode of the cathode ray tube. The blanking component is used to blank out the beam of the cathode ray tube during horizontal retrace. Because of the high frequency response of the video peaking circuits, however, ringing of the trailing edge of the synchronizing component of the signal may occur during horizontal retrace of the beam causing synchronizing signal overshoot to momentarily unblank the cathode ray tube. This momentary unblanking may appear as a "rope" or line about one-third of the way over from the edge of the screen.

In some television receivers a negative pulse is taken from the horizontal output transformer and coupled through a suitable network to a control electrode of a cathode ray tube. This negative pulse is used to blank the tube during horizontal retrace when the above described synchronizing signal overshoot may cause the tube to become momentarily unblanked. This method of synchronizing signal overshoot blanking, however, is dependent on availability of a suitable source of horizontal output pulses in the receiver, and, because of the necessity of associated components, is relatively expensive to produce.

It is an object of this invention to provide an improved blanking circuit for a cathode ray tube in a television receiver.

Another object is to provide an improved blanking circuit, in a television receiver adjusted for good high frequency response to the received signal, that is relatively simple and economical to produce.

One feature of this invention is a blanking circuit, in a television receiver for blanking the beam of a cathode ray tube during horizontal retrace, having a self-biased sync clipper tube for amplitude separating the synchronizing signal from the composite video signal and having a portion of the separated signal coupled to a control electrode of the cathode ray tube for blanking the tube during horizontal retrace.

Another feature of this invention is a blanking circuit, in a television receiver adjusted for good high frequency response of the received signal, for blanking the beam of a cathode ray tube during horizontal retrace having a composite video signal including blanking and synchronizing pulses coupled to the cathode of the cathode ray tube and blanking the tube during horizontal retrace, with the tube being subject to momentary conduction during retrace, whereupon a portion of the separated sync signal having a negative polarity is coupled to a control grid of the cathode ray tube to blank the tube during the period of momentary conduction.

The invention is illustrated in a single figure of the drawing which is a schematic diagram showing the improved blanking circuit incorporated in a television receiver.

In operation, a composite video signal having a positive polarity and including video frequency components and pulses representing synchronizing signal components and blanking signal components is coupled to the cathode of the cathode ray tube in a television receiver. The blanking components of the signal blanks the beam of the tube during horizontal retrace. However, because the video peaking circuits of the receiver are adjusted to provide good response to high frequencies in the incoming video signal, there may be a ringing of the trailing edge of the synchronizing signal portion of the composite signal when it drops off. This ringing can cause beam conduction during retrace (unblanking) which is effectively synchronizing signal overshoot. To correct for this momentary unblanking, a portion of the horizontal output pulse from a synchronizing signal separator or clipper tube, which amplitude separates the sync signal component in the composite video signal, is coupled to a grid of the cathode ray tube to blank the tube when it is momentarily unblanked by the synchronous signal overshoot during the horizontal retrace.

Referring now to the drawing, the illustrated television receiver includes a tuner 10 which selects the signals from an associated antenna to convert a received signal to a fixed frequency for further selection and amplification in IF amplifier 12. Amplifier 12 is coupled to the detector 14 which demodulates a received composite video signal having pulses representing blanking and synchronizing components, video frequency components, and a modulated sound carrier. The demodulated television signal is applied to the video amplifier 16 and this circuit provides a sound subcarrier which is coupled to the sound system 18. The demodulated television signal is also applied through a direct current circuit from the detector 14 and through the video amplifier 16 to the gated automatic gain control circuit 26. Circuit 26 is gated by means of a pulse occurring at the line or horizontal deflection frequency applied thereto over lead 27. A control potential developed by circuit 26 and having a value dependent upon the strength of the received signal is applied to tuner 10 and IF amplifier 12 for regulating the gain thereof.

The detected and amplified composite video signal from amplifier 16, shown by the waveform 29, is coupled to the cathode 28 of the image reproducer or cathode ray picture tube 30 by the blocking capacitor 23 and peaking coil 24. Circuit 25 includes a potentiometer for establishing the cathode bias of tube 30 and acts as a brightness control. The composite video signal 29 is also coupled from video amplifier 16 by capacitor 22 to the self-biasing network 36, which is coupled to the grid 31 of synchronizing signal separator or clipper tube 32. The synchronizing signal separator 34, of which the clipper tube 32 is a part, amplitude separates the synchronizing signal component from the composite video signal. The horizontal pulse waveform on plate 37 of the separated horizontal synchronizing signal is shown at 40. A direct current potential at 80 is coupled by a voltage divider formed from resistors 81, 70 and 71 to the plate 37 for anode potential supply.

The output pulse 40, negative in polarity, is coupled by capacitor 42 to the phase detector 45 which controls horizontal oscillator 46. The horizontal deflection circuit 48 is fed by oscillator 46 and develops a suitable sawtooth scanning current for the horizontal deflection winding 49 disposed on the neck of the cathode ray tube 30, as well as providing the high voltage to the screen of the tube at 50.

The vertical synchronizing signal portion of the output from synchronizing signal separator circuit 34 is coupled by resistor 52 and capacitor 53 to the vertical deflection system represented at 55. The vertical deflection system generates a sawtooth current in response to this component of the synchronizing signal. The sawtooth wave current from the output of the vertical deflection system is applied to the deflection winding 58 for vertical deflection of the cathode ray beam. Pulse signals at vertical frequency are also connected to the grid 60 to complement vertical blanking of the tube 30.

Considering now the operation of the horizontal blanking circuit, the composite video signal 29 coupled from the video amplifier 16 to the cathode 28 of tube 30 contains video frequency component 61 and pulses with a blanking component 62 and a horizontal synchronizing component 63. Because the video signal peaking circuits are tuned for good high frequency response to insure that the detail of the video signal will be clearly displayed on the tube 30, a certain amount of ringing may take place in the leading and trailing edges, 65 and 66 respectively, of the horizontal synchronizing signal 63. This ringing in the leading edge 65 is not harmful since it drives the tube blacker than black, i.e., further out of conduction. Ringing, however, in the trailing edge 66 as it drops off during the blanking of the tube 30 (sometimes called synchronizing signal overshoot) drives the tube 30 out of the black level, i.e., into conduction. This momentary conduction of the tube 30 during blanking by pulse component 62 appears on the screen of the tube 30 as a line or "rope" about one-third of the way over from the edge of the screen.

In order to eliminate this "rope," the tube 30 must be blanked during this momentary conduction period. This is accomplished by coupling a portion of the horizontal synchronizing pulse 40, of negative polarity, from the plate 37 of the clipper tube 32 to the control grid 68 of the tube 30, to bias the tube off regardless of the amplitude of the synchronizing signal overshoot. The time constants of the circuit 34 insure that blanking pulses 72 from the sync clipper 32 have the proper delay to blank the tube 30 during the time it is momentarily unblanked by the synchronizing signal overshoot 66.

The coupling network includes a voltage divider formed by resistors 70 and 71. This divider reduces the amplitude of the pulse 40 as shown by waveform 72. By reducing the amplitude of the pulse 40, the width of the pulse applied to grid 68 is not sufficient to blank the start of the beam trace. The shape of pulse 72 is retained when passing through the filtering circuit formed by capacitor 74 and resistor 75. This filtering circuit removes spurious signals from the circuit essentally caused by noise accompanying the sync pulse. If the amplitude of waveform 72 was too great, the filtering circuit would widen the pulse shape and cause blanking of the tube 30 to extend into the next beam scanning cycle.

What has been described, therefore, is a simple and economical circuit for blanking a cathode ray tube in a television receiver during that time when synchronizing signal overshoot may cause momentary unblanking. The circuit requires the addition of only two resistors and a capacitor for fully satisfactory operation.

I claim:

1. A circuit for blanking the beam of a cathode ray tube in a television receiver during horizontal retrace, including in combination, a source of composite video signal having video frequency components and pulses representing synchronizing and blanking components, a cathode ray tube having first and second control electrodes, circuit means for coupling said composite signal to said first control electrode so that said pulses blank said tube during the horizontal retrace, with said tube being subject to momentary conduction during horizontal retrace due to overshoot of the synchronizing components in said circuit means, synchronizing signal separator means coupled to said signal source for amplitude separating said synchronizing pulses from said composite video signal, means to apply at least a portion of the separated synchronizing signal to said second control electrode from said signal separator means during retrace and with polarity to blank said tube for the period of said momentary conduction during the horizontal retrace.

2. A circuit for blanking the beam of a cathode ray tube in a television receiver during horizontal retrace, including in combination, a source of composite video signal having video frequency components and pulses of positive polarity representing synchronizing and blanking components, a cathode ray tube having cathode and grid electrodes, circuit means for coupling said composite signal to said cathode electrode so that said pulses blank said tube during the horizontal retrace, with said tube being subject to momentary conduction during horizontal retrace due to overshoot of the synchronizing components in said circuit means, synchronizing signal separator means coupled to said signal source for amplitude separating said synchronizing pulses from said composite video signal, filter means connected between said signal separator means and said grid electrode to apply at least a portion of said separated synchronizing signal to said grid electrode during retrace with negative polarity to blank said cathode ray tube for the period of said momentary conduction during horizontal retrace.

3. A blanking circuit in a television receiver adjusted for optimum high frequency response of the received signal, for blanking the beam of a cathode ray tube during horizontal retrace, including in combination, a video amplifier for supplying a composite video signal having video frequency components and pulses representing synchronizing and blanking components, a cathode ray tube having a cathode and a control grid, means including a blocking capacitor and a peaking inductor coupling said composite signal to said cathode so that said blanking pulses blank said tube during horizontal retrace, with the adjustment for high frequency response causing said synchronizing pulses to ring thereby momentarily unblanking said tube, means for amplitude separating said synchronizing pulses from said composite video signal including a sync clipper tube having a plate, grid and cathode, means including a self-biasing network for said clipper coupling said composite signal from said video amplifier to said grid, said cathode of said clipper being connected to a reference potential, means coupling a portion of said amplitude separated synchronizing pulses from said plate to said control grid of said cathode ray tube and with polarity to blank said tube during said momentary unblanking by said ringing synchronizing signal during horizontal retrace.

4. A blanking circuit in a television receiver adjusted for optimum high frequency response of the recevied signal for blanking the beam of a cathode ray tube during horizontal retrace, including in combination, a video amplifier for supplying a composite video signal having a positive polarity and including video frequency components and pulses representing synchronizing and blanking components, a cathode ray tube having a cathode and a control grid, means including a blocking capacitor and a peaking inductor coupling said composite signal to said cathode so that said blanking pulses blank said tube during horizontal retrace, with the adjustment for high frequency response causing said synchronizing pulses to ring thereby momentarily unblanking said tube, means for amplitude separating said synchronizing pulses from said composite video signal including a sync clipper tube having a plate, grid and cathode, means including a self-biasing network for said clipper coupling said composite signal from said video amplifier to said grid, said cathode of said clipper being connected to a reference potential, means including a voltage divider and filtering network coupling a portion of said amplitude separated synchronizing pulses with a negative polarity from said plate to said control grid of said cathode ray tube for blanking said tube during said momentary unblanking by said ringing synchronizing signal during horizontal retrace.

References Cited

UNITED STATES PATENTS

| | | | |
|---|---|---|---|
| 2,673,892 | 3/1954 | Richman | 178—7.55 |
| 2,950,342 | 8/1960 | Revercomb | 178—7.35 |

JOHN W. CALDWELL, *Primary Examiner.*

R. L. RICHARDSON, *Assistant Examiner.*